US007033162B2

United States Patent
Yamaguchi et al.

(10) Patent No.: US 7,033,162 B2
(45) Date of Patent: Apr. 25, 2006

(54) INJECTION BLOW MOLDING DEVICE

(75) Inventors: Hisao Yamaguchi, Nagano-ken (JP); Wataru Horiuchi, Nagano-ken (JP)

(73) Assignee: A.K. Technical Laboratory, Inc., Nagano-ken (JP)

( * ) Notice: Subject to any disclaimer, the term of this patent is extended or adjusted under 35 U.S.C. 154(b) by 266 days.

(21) Appl. No.: 10/722,112

(22) Filed: Nov. 25, 2003

(65) Prior Publication Data
US 2004/0137105 A1   Jul. 15, 2004

(30) Foreign Application Priority Data
Nov. 29, 2002   (JP)   ............................. 2002-347684

(51) Int. Cl.
*B29C 49/06*   (2006.01)
*B29C 49/48*   (2006.01)
(52) U.S. Cl. ....................... 425/533; 425/534; 425/541
(58) Field of Classification Search ................ 425/522, 425/533, 534, 529, 541; 264/537, 538
See application file for complete search history.

(56) References Cited

U.S. PATENT DOCUMENTS 3,244,778 A * 4/1966 Ninneman .................. 264/537
3,471,896 A * 10/1969 Ninneman .................. 425/529
3,488,805 A * 1/1970 Grothjan et al. ............. 425/533
3,816,580 A * 6/1974 Valyi .......................... 264/537

FOREIGN PATENT DOCUMENTS

JP         2000043128 A  *  2/2000

* cited by examiner

*Primary Examiner*—Robert B. Davis
(74) *Attorney, Agent, or Firm*—Weingarten, Schurgin, Gagnebin & Lebovici LLP

(57) ABSTRACT

An injection blow molding device in which a lip mold is formed in different shapes for an injection mold and a blow mold. Mold clamping surfaces corresponding to the different shapes are formed on the injection mold and the blow mold, respectively, to prevent an air leakage from the blow mold. An upper portion of an outside surface of the lip mold which contacts the mold is formed in a tapered surface whereas a lower end portion of the outside surface is formed in a vertical surface. The upper portion and the lower portion of a surface contacting the lip mold, of each of the injection mold and the blow mold are formed respectively in a tapered surface and a vertical surface that correspond to the tapered surface and the vertical surface of the outside surface of the lip mold. Clamping the lip mold in the injection mold is performed at the tapered surface of the upper portion and clamping the lip mold in the blow mold is performed at the vertical surface of the lower end portion.

2 Claims, 3 Drawing Sheets

Injection mold side | Blow mold side

Injection mold side | Blow mold side

PRIOR ART

INJECTION BLOW MOLDING DEVICE

This application claims priority to a Japanese patent application No. 2002-347684 filed Nov. 29, 2002.

BACKGROUND OF THE INVENTION

1. Field of the Invention

This invention relates to a molding device that commonly uses a lip mold to perform an injection molding and a blow molding of a preform.

2. Description of the Related Art

In a conventional injection blow molding device in the related art, an injection mold and a blow mold which use a lip mold in common (alternatively, referred to as a neck mold) are provided and the outside surface, which is brought into contact with the molds, of the lip mold is formed in a tapered surface and the lip mold can clamp both of the injection mold and the blow mold. (see JP-A 2000-43128 (FIG. 1, FIG. 2)

FIG. 5 shows a state in which the blow mold is clamped by the above-mentioned conventional tapered surface in the related art. A reference numeral 1 denotes a lip mold and 2 denotes a blow mold and both of them are constructed of split molds which can be freely clamped or unclamped. A reference numeral 3 denotes an injection molded preform which is gripped by the lip mold 1 and is transferred from an injection mold (not shown) to the center of the unclamped blow mold 2. The blow mold 2 clamps the lip mold 1 in such a way that it sandwiches the lip mold 1 on both its sides. Thereby, the lip mold 1 is fitted in the blow mold 2 and the preform 3 is received in a blow cavity 4 formed when the blow mold 2 clamps the lip mold 1.

A reference numeral 5 denotes a blow core. After or while the blow mold 2 clamps the lip mold 1, the blow core 5 is inserted and fitted in the lip mold 1, to press its tip into the lip portion 3a of the preform 3. Thereby, the lip portion 3a can be hermetically clamped. A reference numeral 6 is a stretch rod that is provided in the center of the blow core 5 so as to freely extend or contract. With air blowing, the stretch rod 6 is extended to the bottom of the cavity 4 to form the preform 3 into a hollow product 7 such as a thin-walled bottle or a wide-mouthed bottle.

In the above-mentioned blow mold 2, if the surfaces of the lip mold 1 and the blow mold 2 which are brought into close contact with each other to clamp the lip mold 1 in the blow mold 2 (hereinafter referred to as "mold clamping surface") are formed in tapered surfaces and the lip mold 1 is fitted in the blow mold 2, as the pressure setting value of blowing air increases, air is apt to leak from the mold clamping surface. This air leakage from the mold clamping surface at the high pressure setting is thought to be caused by the facts that the lip mold 1 and the blow mold 2 are formed of split molds and that the lip mold 1 is floated by air pressure.

In a case where the lip mold 1 is fitted in the blow mold 2 to clamp the blow mold 2, it is most preferable that clamping the molds is performed by the fit between the tapered surfaces of the molds. However, if the degree of the fit between the tapered surfaces goes out of alignment even in limited amounts, it is difficult to completely clamp the molds and as shown in the left side in FIG. 5, a clearance a is produced between the lip mold 1 and the blow mold 2. Although the clearance a is very small, when the blow core 5 blows high-pressure air into the preform 3 in such a state of fit, the lip mold 1 is expanded by the air pressure to the position where the lip mold 1 is brought into contact with the mold clamping surface of the blow mold 2. Then, the insufficient pressing force of the blow core 5 causes the lip mold 1 to float.

These phenomena causes a series of clearances b, c, shown in the right side in FIG. 5, between the inside surface of the lip mold 1 and the outside surface of the blow core 5 and between the lip portion 3a and the tip side wall of the blow core 5. Then, a part of blowing air leaks outside through these clearances c and b and makes large air leak noises. Then, the air leak noises become large noises in a work shop and disturb work. Moreover, the air leak reduces air pressure to cause molding defects in the hollow bottle 7.

In the injection mold of the preform, the preform can be pulled out of an injection core and a cavity. Hence, the injection mold does not need to be constructed of split molds and the mold can be placed at a position as designed with respect to an upper lip mold at the time of assembling the machine. Therefore, the mismatch of the degree of fit hardly causes a displacement in the position of the tapered surfaces.

However, in the blow mold, a pair of split molds are always moved, thereby being clamped or unclamped. Hence, it is more difficult to position the blow mold with respect to the lip mold when assembling a molding machine, as compared with the case of the injection mold. Therefore, the height and position of the blow mold are adjusted after assembling the molding machine to provide the degree of fit as designed. This adjustment of the degree of fit is performed as follows: every time the adjustment is finished, it is repeated that the molding machine is operated to blow a hollow bottle for a try and that the hollow bottle is checked for the presence or absence of air leakage. Therefore, this adjustment requires effort and time and causes a loss of material and hence becomes an extremely uneconomical work.

This invention has been made to solve the problems raised at the time of clamping the above-mentioned blow mold by the fit of the tapered surfaces of the blow mold and the lip mold. The object of the invention is to provide a novel injection blow molding device in which the outside surface, which is brought into contact with an injection mold and a blow mold, of a lip mold is formed in separate shapes for the injection mold and for the blow mold and in which the injection mold and the blow mold are respectively provided with the mold clamping surfaces corresponding to these separate shapes thereby to prevent an air leakage in a blow mold without interfering with injection molding of a preform.

SUMMARY OF THE INVENTION

According to one aspect of the invention, there is provided an injection blow molding device comprising: a lip mold that is designed for a preform and formed of a pair of split molds being clampable; an injection mold that is designed for the preform and fitted on and clamped with the lip mold; a blow mold that is fitted on and clamped with the lip mold; an injection core mold that pierces the lip mold and is located in the injection mold; and a blow core that is inserted into the lip mold, wherein an upper portion of a fitting surface, on which the injection mold and the blow mold are fitted, of the lip mold is formed in a surface tapered downward whereas a lower portion of the outside surface is formed in a vertical surface, an upper portion of a fitting surface, on which the lip mold is fitted, of each of the injection mold and the blow mold is formed in a surface tapered downward whereas a lower portion of the surface is formed in a vertical surface, clamping the lip mold in the injection mold is performed by putting the tapered surfaces formed on the upper portions of the fitting surfaces of both the molds into contact with each other, and clamping the lip mold and the blow mold is performed by putting the vertical surfaces formed on the lower portions of the fitting surfaces of both the molds into contact with each other.

In accordance with another aspect of the invention, there is provided the injection blow molding device, wherein a clearance is provided with between the vertical surfaces formed on the lower portions of the respective fitting surfaces of the injection mold and the lip mold, and wherein another clearance is provided with between the tapered surfaces formed on the upper portions of the respective fitting surfaces of the blow mold and the lip mold to prevent biting and interfering in molds when mold clamping.

BRIEF DESCRIPTION OF THE INVENTION

DESCRIPTION OF THE PREFERRED EMBODIMENTS

Figure 1:
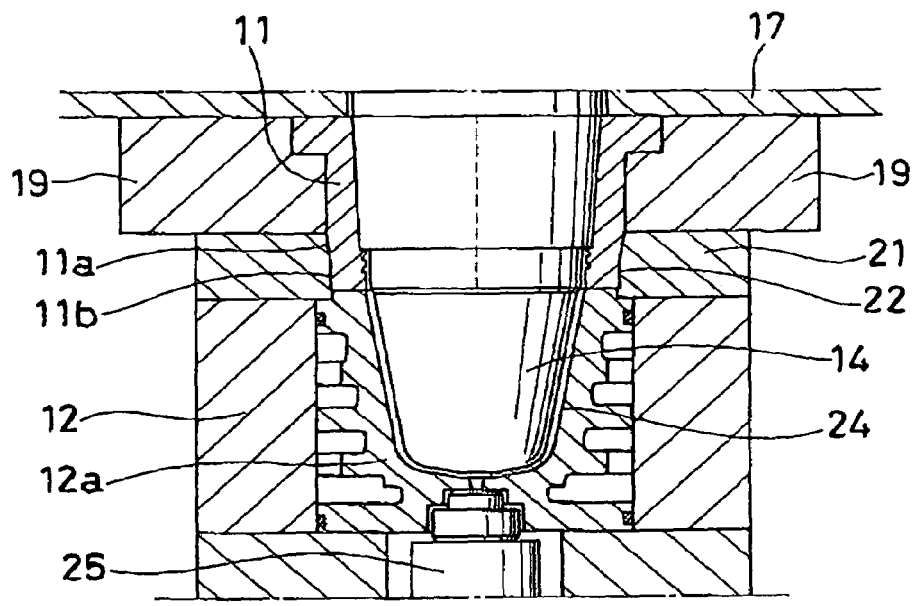
FIG. 1 is a longitudinal sectional view of an injection mold in an injection blow molding device in accordance with this invention.

FIG. 1 to FIG. 4 show one preferred embodiment of this invention. A reference numeral 11 denotes a lip mold, 12 denotes an injection mold, 13 denotes a blow mold, 14 denotes an injection core and 15 denotes a blow core through which a stretch rod 16 passes.

Figure 3:
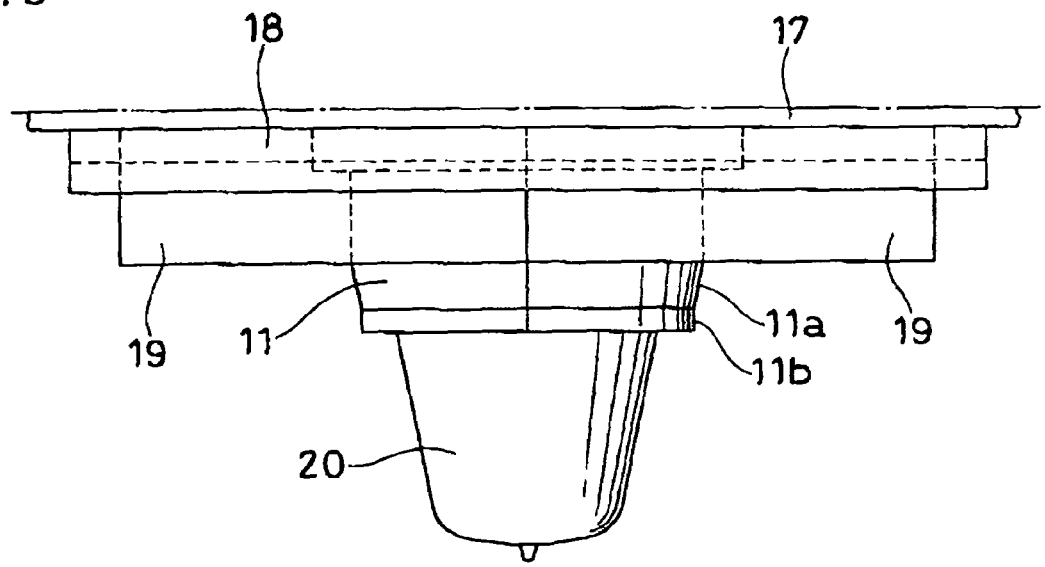
FIG. 3 is a side view of a lip mold and a seat plate.

The above-mentioned lip mold 11, as shown in FIG. 3, is constructed of a pair of split molds mounted in an mating manner respectively on a pair of seat plates 19 that are fitted in guide members 18 and opposed to each other in such a way as to be freely clamped or unclamped in a lateral direction, the guide member 18 being mounted on the bottom surface of a rotary transfer disk 17 placed on a molding machine (not shown) movable in a vertical direction. Then, the lip mold 11 has a mold surface for forming the lip portion (opening) 20a of a wide-mouthed preform 20 on the inside of its tip portion. Moreover, the outside surface, which is brought into contact with the mold, of the lip mold 11 has an upper portion 11a formed in a tapered surface and a lower end portion 11b formed in a vertical surface.

Figure 4:
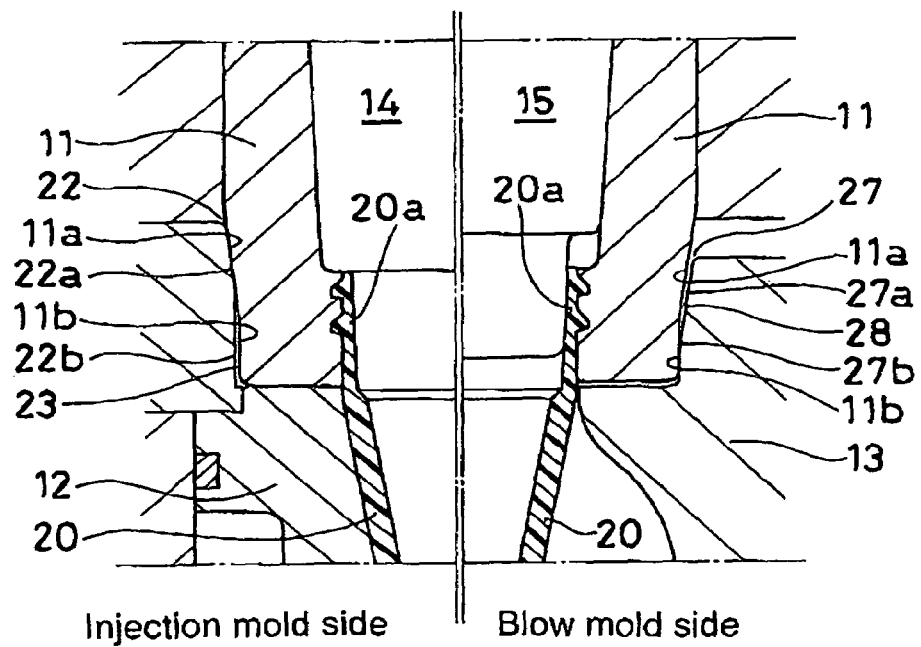
FIG. 4 is a longitudinal sectional view to show a state where a lip mold is clamped in the injection mold and the blow mold.
Figure 5:
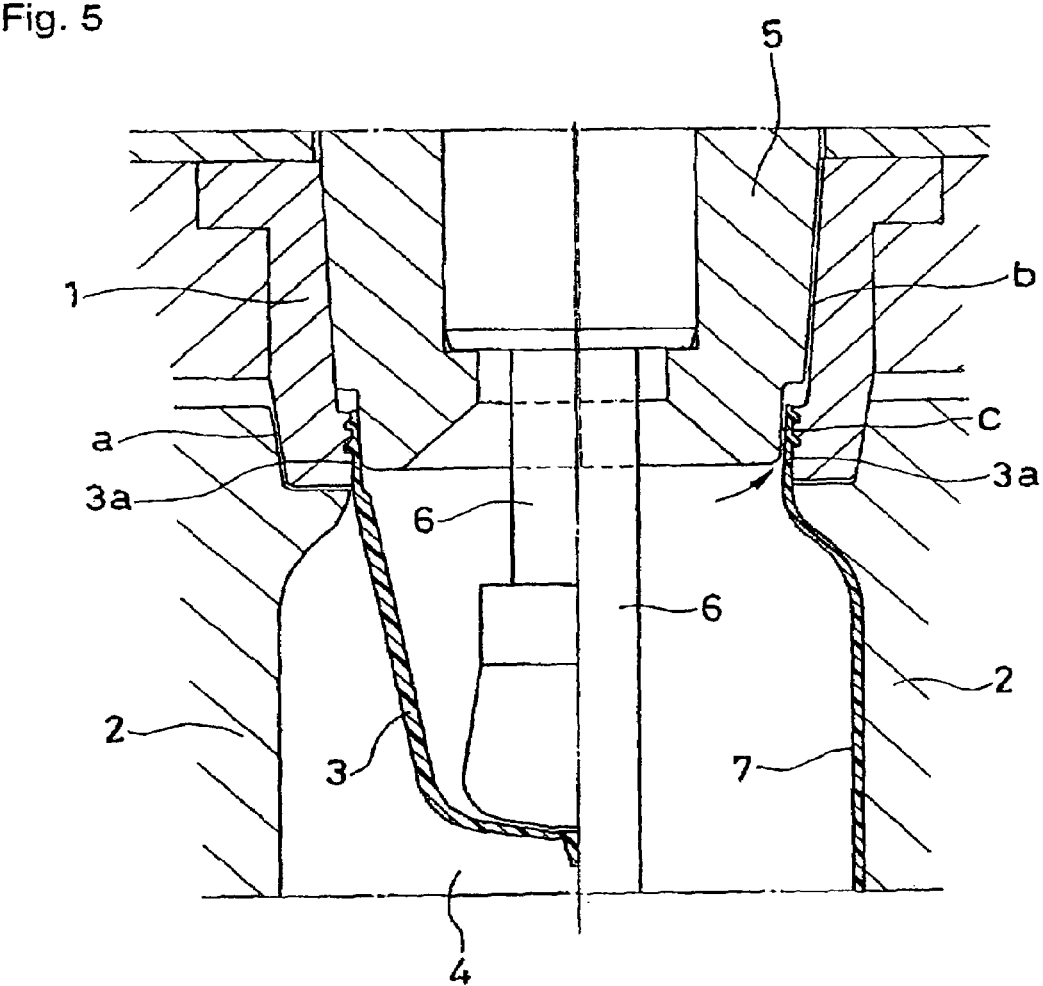
FIG. 5 is a longitudinal sectional partial view to show a state at the time of clamping the mold in a conventional blow molding on the left side and a state at the time of blowing air on the right side.

The above-mentioned injection mold 12, as shown in FIG. 1, has a mold clamping plate 21 placed on an upper portion of a cavity mold 12a. Then, in the mold clamping plate 21 is formed a mold clamping opening 22 which is closed by clamping the lip mold 11 in the injection mold 12. The inside surface of the mold clamping opening 22, as shown in the left side in FIG. 4, is formed in a lip mold fitting surface including an upper portion 22a of a tapered surface and a lower end portion 22b of a vertical surface both portions of which correspond to the upper portion 11a and the lower end portion 11b of the outside surface of the lip mold 11, respectively.

Then, the inside diameter of the lower end portion 22b is made slightly larger than the outside diameter of the lower portion 11b of the lip mold 11 to provide a clearance 23. This clearance 23 enables the tapered surfaces of the upper portions to be fitted onto each other to fit the lip mold 11 onto the injection mold 12 thereby to tightly clamp the injection mold 12 and prevents the lower end portion 11b formed in the vertical surface from biting the injection mold 12 when the lip mold 11 is clamped in the injection mold 12.

In this injection mold 12, the above-mentioned injection core 14 is inserted from above through the clamped lip mold 11 into the cavity mold 12a and then fused resin is injected and filled into an injection cavity 24 formed by the injection core 14 from an injection nozzle 25 in the bottom, whereby the above-mentioned preform 20 can be molded.

Then, by moving up and pulling out the injection core 14 and by moving up the rotary transfer disk 17 to move up the lip mold 11, as shown in FIG. 3, the injection molded preform 20 is separated from the cavity mold 12a in a state where it is fitted on the lip mold 11. Then, the preform 20 is transferred by the rotary transfer disk 17 along with the lip mold 11 to the position of the blow mold 13 where the preform 20 is blow molded and drawn and blown into a wide-mouthed bottle.

Figure 2:
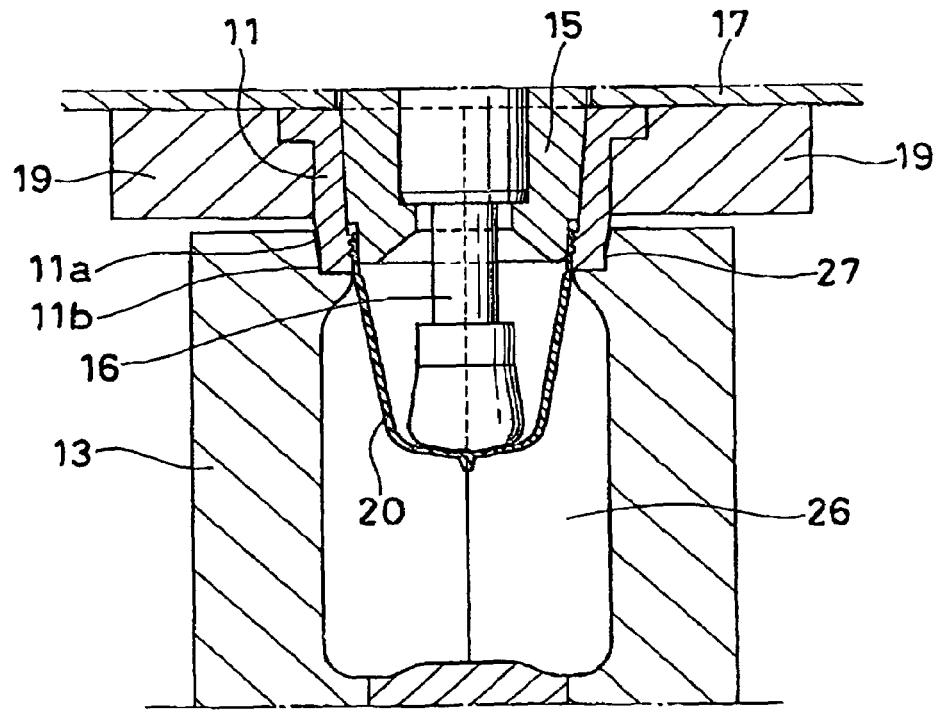
FIG. 2 is a longitudinal sectional view of a blow mold of the same device.

The above-mentioned blow mold 13, as shown in FIG. 2, is constructed of a pair of split molds that are placed on the machine base (not shown) in such a way as to be freely clamped or unclamped in a lateral direction. The top portions, which are located at the top of the blow cavity 26 when the split molds are clamped, of the split molds are formed in the shape of a step to form a mold clamping opening 27 which is closed by clamping the lip mold 11 in the blow mold 13. The inside surface of the mold clamping opening 27, as shown in the right side in FIG. 4, is formed in a lip mold fitting surface including an upper portion 27a of a tapered surface and a lower end portion 27b of a vertical surface both portions of which correspond to the upper portion 11a and the lower end portion 11b of the outside surface of the lip mold 11, respectively.

Then, the taper diameter of the upper portion 27a is made slightly larger than the taper diameter of the upper portion 11a of the lip mold 11 to provide a clearance 28. When the lip mold 11 is clamped in the blow mold 13, this clearance 28 enables a mold fastening force to bring the lower portions of the molds into contact with each other from the side without interference of the tapered surfaces of the upper portions to fit the lip mold 11 in the blow mold 13, thereby tightly clamping the molds without clearance therebetween.

In this blow mold 13, the preform 20 is transferred to the blow mold 13 and then the rotary transfer disk 17 is moved down to locate the lip mold 11 at the center of the split molds in a state where the molds are unclamped. Then, just as with the conventional molding, the split molds are moved forward in such a way as to sandwich the lip mold 11 from both sides to clamp the split molds. Thereby, the lip mold 11 is fitted in the mold clamping opening 27 from the sides, whereby the preformed 20 is received in the blow cavity 26 formed by the clamped split molds.

During or after clamping the split molds, the above-mentioned blow core 15 is inserted into and fitted in the lip mold 11 from above to the position where the tip of the blow core 15 reaches the lip portion 20a of the preform 20. Then, by pressing the tip portion of the blow core into the lip portion 20a, the lip portion 20a is hermetically clamped. After clamping the blow mold 13, the drawing rod 16 passed through the blow core 15 in such a way as to be freely extended or contracted is extended to the bottom of the cavity 26 with air blowing, whereby the preform 20 is expanded fully in the cavity 26 and is molded into a thin-walled wide-mouth bottle, although not shown.

In this molding device, the upper portion 11*a* of the outside surface, which is put into contact with the mold, of the lip mold 11 is formed in the tapered surface and the lower end portion 11*b* thereof is formed in the vertical surface, and clamping the injection mold 12 by inserting the lip mold 11 into the clamping opening 27 is performed at the tapered surface, and clamping the blow mold 13 from both sides is performed at the vertical surfaces. As a result, this mold device employs a method that is most suitable for clamping the injection mold 12 and for clamping the blow mold 13.

In particular, in the blow mold 13, the vertical surfaces are put into contact with each other to keep the mold in a clamped state and hence even if a measure of displacement occurs in the vertical direction, as far as the lower end portion 11*b* is received in the lower end portion in the mold clamping opening 27, the lip mold 11 is pressed by the split molds of the blow mold 13 to keep the tight clamped state. Therefore, unlike a case where the mold is clamped by the tapered surfaces, a clearance is not caused between the lip mold 11 and the mold clamping opening 27 and hence even if high-pressure air is blown, the lip mold 11 is prevented from being opened to cause air leakage.

For example, in a conventional case where the blow mold is clamped by fitting the tapered surfaces, an air leakage is not caused at a pressure setting value of 0.1 MPa but is caused at a pressure setting value of 0.15 MPa. In contrast, in a case where the blow mold is clamped by fitting the vertical surfaces, the air leakage is not caused even at a pressure setting value of 0.3 MPa. Recently, the blow molding and in particular, the drawing and blow molding are performed at a pressure setting value of 0.15 MPa or more in many cases, and some products require a pressure setting value of 0.25 MPa or more. The above-mentioned technique of clamping the blow mold by fitting the vertical surfaces can respond to this high pressure setting value. Further, this technique eliminates the need for placing the blow mold at the time of assembling the machine with such as high accuracy that is required in the related art. Still further, this technique can save effort and time required to make a check for air leakage every time adjustment is finished, as is the case with the conventional blow mold, and can reduce a loss of material and perform an economical work.

What is claimed is:

1. An injection blow molding device comprising:
    a lip mold that is designed for a preform and formed of a pair of split molds being clampable;
    an injection mold that is designed for the preform and fitted on and clamped with the lip mold;
    a blow mold that is fitted on and clamped with the lip mold;
    an injection core mold that pierces the lip mold and is located in the injection mold; and
    a blow core that is inserted into the lip mold,
    wherein an upper portion of a fitting surface, on which the injection mold and the blow mold are fitted, of the lip mold is formed in a surface tapered downward whereas a lower portion of the outside surface is formed in a vertical surface,
    wherein an upper portion of a fitting surface, on which the lip mold is fitted, of each of the injection mold and the blow mold is formed in a surface tapered downward whereas a lower portion of the surface is formed in a vertical surface,
    wherein clamping the lip mold in the injection mold is performed by putting the tapered surfaces formed on the upper portions of the fitting surfaces of both the molds into contact with each other, and
    wherein clamping the lip mold and the blow mold is performed by putting the vertical surfaces formed on the lower portions of the fitting surfaces of both the molds into contact with each other.

2. The injection blow molding device as claimed in claim 1, wherein a clearance is provided with between the vertical surfaces formed on the lower portions of the respective fitting surfaces of the injection mold and the lip mold, and wherein another clearance is provided with between the tapered surfaces formed on the upper portions of the respective fitting surfaces of the blow mold and the lip mold to prevent biting and interfering in molds when mold clamping.

* * * * *